April 3, 1934.     C. W. ALBERTSON     1,953,383
PRESSURE RESISTING MEMBER
Filed June 13, 1932
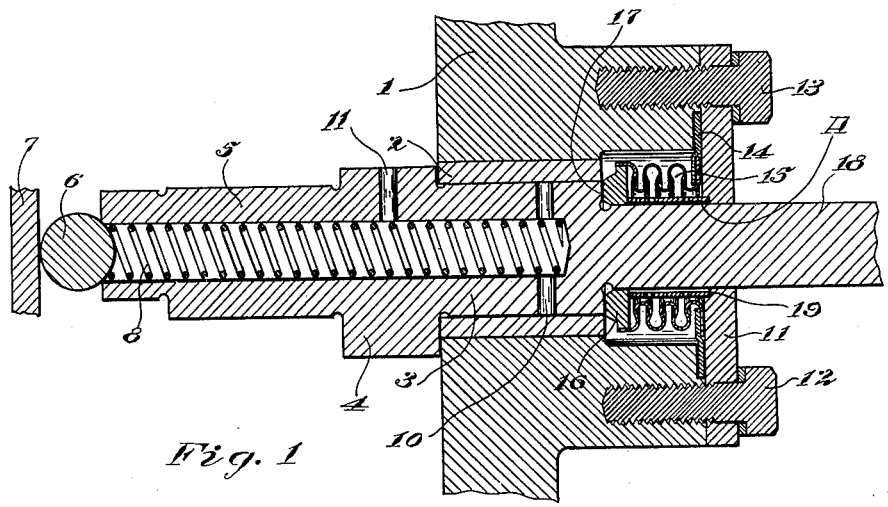
Fig. 1
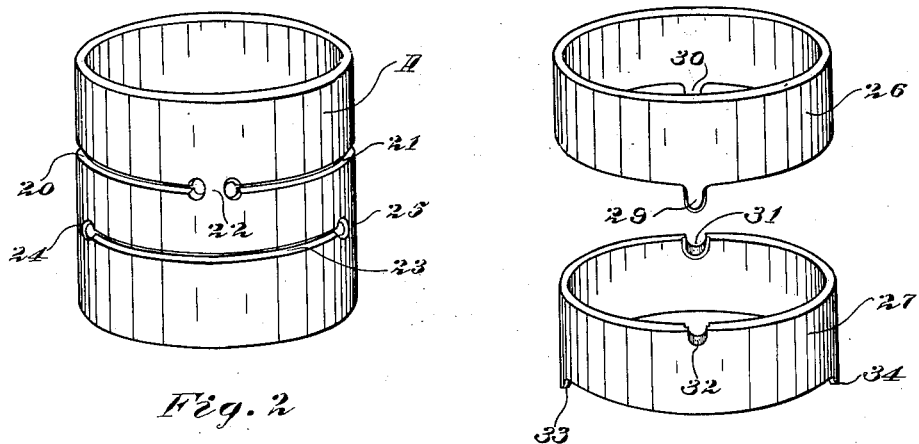
Fig. 2
Fig 4
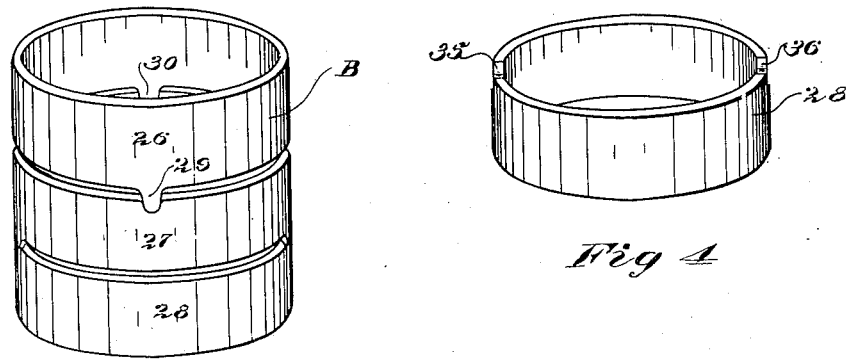
Fig. 3
INVENTOR
Carl W. Albertson
BY
ATTORNEY Patented Apr. 3, 1934

1,953,383

UNITED STATES PATENT OFFICE 1,953,383

PRESSURE RESISTING MEMBER

Carl W. Albertson, St. Paul, Minn.

Application June 13, 1932, Serial No. 616,780

2 Claims. (Cl. 286—11)

The present invention relates to a pressure resisting member.

In the art of mechanical refrigeration, a material problem presents itself in the sealing of the shaft of the pump for the refrigerating fluid, which, in certain phases of operation, is in the form of a gas, and in others, in the form of a liquid. Since the refrigerant operates in a closed cycle, it is imperative that none escape.

A well known method of sealing the pump shaft is to provide a shoulder on the shaft upon which rides a sealing ring mounted on a bellows which is sealed to the pump frame. A pressure resisting member holds the sealing ring against the shoulder. Attempts have been made to use either a tube or a coil spring as a pressure resisting member for this purpose, but neither of these have been entirely satisfactory, since, in using the tubular member, the sealing ring, the tubular member, and the shaft shoulder must all be absolutely true in order to give equal pressure over the entire circumference of the sealing ring. Where a coil spring is used, there is usually a greater pressure on one side than the other. Furthermore, the coil spring permits longitudinal movement of the shaft where excess pressure is exerted thereon, which movement causes compression of the coil spring, and this feature is recognized as objectionable by those skilled in the art.

An object of the present invention is to make an improved pressure resisting member which will resist longitudinal pressure, but will be free for limited lateral bending movement in any direction.

In order to attain this object, there is provided, in accordance with one feature of the invention, a plurality of similar annular members positioned coaxially and connected by diametrically opposed supports to hold said members in longitudinally spaced position to be free for limited lateral bending about a diameter defined by said supports.

These and other features of the invention will be more fully brought out in the following description and the accompanying drawing, wherein:

Figure 1 is a longitudinal sectional view through a refrigerator pump shaft and portion of pump housing and associated parts.

Figure 2 is a view in perspective of a pressure resisting member embodying the invention.

Figure 3 is a view, also in perspective, of a modified form of the invention shown in Figure 2; and Figure 4 is a view, also in perspective, showing the component parts of the device shown in Figure 3, separated in the direction of their axes.

Referring to the drawing in detail, a portion of a pump housing 1 has a bushing 2 therein in which is rotatably mounted a shaft 3. This is a well known type of shaft, having a cam 4 thereon for operating the pump, and having a portion 5 rotatably supported in a bushing, not shown, mounted in the pump housing. A ball thrust bearing member 6 is mounted on the end of the shaft 3 and rests against a plate 7 in a well known manner. A coil spring 8 is mounted within a central opening in the shaft 3 and is held in compression between the ball 6 and the end of the opening in the shaft to exert a longitudinal thrust on the shaft 3. Openings 10 are drilled in the shaft and communicate with the central opening in the shaft to provide lubrication for the bearings, in a well known manner. A plate 11 is bolted to the housing 1, as by means of bolts 12 and 13, and grips an annular bellows supporting member 14 between the housing 1 and the plate 11. A flexible bellows member 15, of a well known type, is secured to the annular member 14 to have an air-tight connection therewith, as by soldering. A sealing ring 16, preferably of brass or bronze, is secured to the opposite end of the bellows, as by soldering, to have an air-tight connection therewith around the entire periphery of the sealing ring 16. The shaft 3 is provided with a shoulder 17 formed by reducing the outer end portion 18 of the shaft, and upon this shoulder rests the sealing ring 16. An annular recess 19 is provided in the plate 11 surrounding the shaft opening centrally thereof, and in this recess is supported the annular pressure resisting member A, comprising the present invention. This member A holds the sealing ring 16 firmly against longitudinal movement toward the bellows, and, at the same time, permits a limited lateral oscillating movement of the sealing ring 16, to compensate for any slight irregularities in the shoulder 17, or in the alinement of the shaft 3. The coil spring 8 holds the shaft 3 firmly against the sealing ring 16 on the shoulder 17.

The pressure resisting member A, comprising the present invention, may be either made from a single piece of steel tubing, as illustrated in Figure 2, with a pair of slotted openings 20 and 21 extending in from opposite sides thereof to leave a narrow pillar 22 of the tube material between the ends thereof, and a second pair of similar slots 23, and one from the opposite side, not shown, to leave similar narrow pillars 24 and 25 of the tube material between the ends thereof, said second pillars being offset ninety degrees from the first pillars 22.

The modified form B, shown in Figures 3 and 4, comprises three annular rings 22, 27, and 28. A pair of depending ears 29 and 30, formed integrally with the upper annular member 26, seat in recesses 31 and 32 in the upper edge of the center annular member 27, to permit a slight lateral rocking motion between these two members. A second pair of ears 33 and 34 offset ninety degrees from the notches 31 and 32 depend from the lower edge of the center annular member 27 and fit into notches 35 and 36, respectively, in the lower annular member 28. The compression member A, or the component annular members 26, 27, and 28, comprising the structure B, are preferably formed of steel and hardened so as to withstand a stress greatly in excess of their normal calculated load without distortion.

It is apparent that either the structure A, shown in Figure 2, or B, shown in Figures 3 and 4, would resist compression under heavy stress, if made from a metal such as steel, while, at the same time, either would be free for a limited lateral bending in any direction, so as to readily compensate for any irregularities of movement between the revolving shaft shoulder 17 and the non-revolving sealing ring 16.

I claim:

1. A pressure resisting member for a sealing ring, mounted in a housing, comprising a portion in engagement with one side of said sealing ring to form a reinforcement therefor, a second portion held in spaced relation from said first portion by diametrically opposed supporting posts integrally connected to said first and second portions, and a second pair of support posts on the opposite side of said second portion and offset ninety degrees from said first posts, said second posts being supported by said housing.

2. A pressure resisting member for a sealing ring, comprising a tubular member having a pair of transverse slots extending inwardly from the sides thereof in the same plane to leave a pair of diametrically opposed support posts, to permit a lateral flexing of said pressure resisting member on said posts, said pressure resisting member having a similar pair of transverse slots longitudinally spaced from said first pair of slots to leave a second pair of similar diametrically opposed support posts angularly offset from said first pair.

CARL W. ALBERTSON.